Patented Sept. 11, 1945

2,384,750

UNITED STATES PATENT OFFICE 2,384,750

MONOAZO ACID DYESTUFFS

Arthur Howard Knight and William Elliot Stephen, Blackley, England, assignors to Imperial Chemical Industries Limited, a corporation of Great Britain No Drawing. Application September 17, 1942, Serial No. 458,732. In Great Britain October 8, 1941

5 Claims. (Cl. 260—199)

The present invention relates to the manufacture of new monoazo acid dyestuffs and to their application to the colouring of animal fibres.

According to the invention we make the dyestuffs by diazotising an amine of the general formula

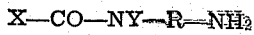
X—CO—NY—R—NH$_2$ in which R stands for a benzene nucleus which may be further substituted with simple azo dyestuff substituents, for example methyl, methoxy or sulphonic acid groups, X stands for a monochloro- or monobromo-alkyl radical having not more than three carbon atoms, Y stands for hydrogen or an alkyl ($C_1$ to $C_6$), aralkyl, cycloalkyl, alkoxyalkyl or aryl radical, and the primary amino group is in the meta or para position to the X—CO—NY— group, and coupling the diazo compound so-obtained with a derivative of 2-amino-5-naphthol-7-sulphonic acid (J-acid) in which one H of the NH$_2$ group is replaced by the acyl group —CO—M, where M is an aliphatic hydrocarbon radical with not more than 6 carbon atoms, and the other H may be replaced by an alkyl or aryl group.

Also according to the invention we use the dyestuffs in colouring animal fibres, e. g., wool and silk.

The dyestuffs dye wool from an acid dyebath, various shades of orange being obtainable; the dyeings are characterised by very good fastness to severe washing and milling, and good fastness to light.

As examples of diazo components which can be employed according to the invention, we mention:

4-amino-1-N-ethyl-omega-chloroacetanilide,
4-amino-1-N-isopropyl-omega-chloroacetanilide,
4-amino-1-N-n-butyl-omega-chloroacetanilide,
4-amino-2-N-ethyl-omega-chloroacet-toluidide,
4-amino-2-N-ethyl-omega-bromopropion-toluidide,
3-amino-omega-chloroacetanilide-4-sulphonic acid,
2-amino-4-N-ethyl-omega-chloroacet-toluidide,
4-amino-2-N-ethyl-α-bromobutyryl-toluidine,
4-amino-2-N-ethyl-α-bromopropion-toluidide,
4-amino-2-N-ethyl-omega-chloropropiontoluidide,
4-amino-1-N-ethyl-omega-chloropropionanilide,
4-amino-1-N-ethyl-omega-bromopropionanilide,
4-amino-1-N-sec-butyl-omega-chloroacetanilide,
4-amino-omega-chloroacetanilide-3-sulphonic acid,
4-amino-2-N-ethyl-omega-chloroacetanisidide,
4-amino-1-N-n-butyl-omega-chloroacetanilide-2-sulphonic acid,
4-amino-1-N-ethyl-omega-bromoacetanilide,
4-amino-1-N-benzyl-omega-chloro-acetanilide,
4-amino-1-N-cyclohexyl-omega-chloroacetanilide,
5-amino-2-N-cyclohexyl-omega-chloroacet-toluidide,
3-amino-1-N-benzyl-omega-chloroacetanilide,
4-amino-2-N-benzyl-omega-chloroacet-toluidide,
4-amino-1-N-phenyl-omega-chloroacetanilide,
4-amino-1-N-cyclohexyl-omega-chloropropionanilide,
4-amino-1-N-cyclohexyl-omega-bromopropionanilide,
4-amino-1-N-cyclohexyl-α-bromopropionanilide,
4-amino-1-N-cyclohexyl-omega-bromo-acetanilide and
4-amino-2-N-benzyl-omega-chloro-acetanisidide (obtainable by methods described in British Patent No. 544,409 or our U. S. Patent No. 2,346,492) and 4-amino-1-N-β-ethoxyethyl-omega-chloroacetanilide (obtainable by acetylating N-β-ethoxyethylaniline, nitrating, removing the acetyl group by hydrolysis, causing the resulting 4-nitro-1-N-β-ethoxyethylaniline to react with chloroacetyl chloride in boiling toluene and reducing the 4-nitro-1-N-β-ethoxyethyl-omega-chloroacetanilide thus obtained.

As examples of coupling components which can be employed according to the invention, we mention 2-acetylamino-, 2-propionylamino-, 2-n-butyrylamino-, 2-N-methyl- and ethyl-N-acetylamino-5-naphthol-7-sulphonic acids and 2-N-phenyl-N-acetylamino-5-naphthol-7-sulphonic acid. 2-propionylamino- and 2-n-butyrylamino-5-naphthol-7-sulphonic acids are obtained by reacting aqueous solutions containing one molecular proportion of the sodium salt of 2-amino-5-naphthol-7-sulphonic acid with rather more than one molecular proportion of propionic and n-butyric anhydrides respectively, until no diazotisable primary amine can be detected, and salting out the acylated products. 2-N-ethyl-N-acetylamino-5-naphthol-7-sulphonic acid can be obtained by adding to an aqueous solution of one molecular proportion of the soduim salt of 2-N-ethylamino-5-naphthol-7-sulphonic acid rather more than one molecular proportion of acetic anhydride and stirring the mixture for some time until the reaction product no longer couples with diazotised p-nitroaniline in mineral acid medium to give a violet colouration. The resulting liquor containing the reaction product can be used for dyestuff preparations if desired.

The following examples, in which the parts are by weight, illustrate but do not limit the invention.

*Example 1*

21.25 parts of 4-amino-1-N-ethyl-omega-chloroacetanilide are dissolved in a mixture of 300 parts of water and 25 parts of 36% hydrochloric acid and then 6.9 parts of sodium nitrite are added. The diazo compound so-obtained, after cooling to 5°–10° C. is added to a stirred and cooled mixture of 30.5 parts of the sodium salt of 2-acetylamino-5-naphthol-7-sulphonic acid, 80 parts of sodium chloride, 350 parts of water and sufficient sodium carbonate to keep the coupling mixture alkaline to litmus. When coupling is complete more sodium chloride is added, the mixture stirred for several hours and the dyestuff filtered off and dried.

It is orange-brown in colour and dissolves in water with a reddish-orange colour. It dyes wool from a dyebath containing sulphuric acid and Glauber's salt in reddish-orange shades, the dyeings having very good fastness to severe washing, milling and light.

*Example 2*

22.6 parts of 4-amino-2-N-ethyl-omega-chloro-acet-toluidide are dissolved in a mixture of 350 parts of water and 25 parts of 36% hydrochloric acid and to the solution at 5°–10° C. there are added 6.9 parts of sodium nitrite. The solution of the diazo compound so-obtained is added with stirring to a cooled mixture of 30.5 parts of the sodium salt of 2-acetylamino-5-naphthol-7-sulphonic acid in 400 parts of water to which 80 parts of sodium chloride have been added and sufficient sodium carbonate or sodium bicarbonate to keep the coupling medium alkaline. The new dyestuff so-obtained is isolated and dried.

It dyes wool in bright reddish-orange shades when applied from a dyebath containing sulphuric acid and Glauber's salt, the dyeings having very good fastness to severe washing, milling and light.

If the above coupling is carried out in the presence of excess sodium acetate instead of sodium carbonate or sodium bicarbonate a dyestuff is obtained yielding on wool somewhat yellower shades of bright reddish orange.

*Example 3*

22.65 parts of 4-amino-1-N-isopropyl-omega-chloro-acetanilide are dissolved in a mixture of 300 parts of water and 25 parts of 36% hydrochloric acid and then 6.9 parts of sodium nitrite are added. The diazo compound so-obtained, after cooling to 5°–10° C. is added to a stirred and cooled mixture of 30.3 parts of the sodium salt of 2-acetylamino-5-naphthol-7-sulphonic acid, 80 parts of sodium chloride, 350 parts of water and sufficient sodium carbonate to keep the coupling mixture alkaline to litmus. When coupling is complete more sodium chloride is added, the mixture stirred for several hours and the dyestuff filtered off and dried.

The dyestuff is orange-brown in colour and dissolves in water with a reddish-orange colour. It dyes wool from a dyebath containing sulphuric acid and Glauber's salt in reddish-orange shades, the dyeings having very good fastness to severe washing, milling and light.

*Example 4*

22.6 parts of 4-amino-2-N-ethyl-omega-chloro-acet-toluidide are diazotised as in Example 2. The diazo solution so-obtained is added to a stirred aqueous solution at about 10° C. of 31.9 parts of the sodium salt of 2-propionylamino-5-naphthol-7-sulphonic acid containing excess sodium carbonate. When coupling is complete the dyestuff is isolated and dried. It is orange in colour, soluble in water, and dyes wool from an acid bath in bright reddish-orange shades, the dyeings having very good fastness to severe washing, milling and light.

*Example 5*

24.05 parts of 4-amino-1-N-n-butyl-omega-chloro-acetanilide are dissolved in 400 parts of water and 30 parts of 36% hydrochloric acid and to the cooled solution 6.9 parts of sodium nitrite are added.

The solution of the diazo compound so-obtained is filtered, if necessary, and added to a cooled and stirred solution of 30.3 parts of the sodium salt of 2-acetylamino-5-naphthol-7-sulphonic acid containing sufficient sodium carbonate to keep the coupling mixture alkaline to litmus. The new dyestuff is salted out if necessary, filtered off and dried. It dyes wool from a dyebath containing sulphuric acid and Glauber's salt in reddish-orange shades, the dyeings having very good fastness to severe washing, milling and light.

If, in the above coupling, the sodium carbonate employed is replaced by 34 parts of crystallised sodium acetate a dyestuff is obtained which yields on wool somewhat yellower and brighter shades of reddish orange, the dyeings having similar fastness properties.

*Example 6*

22.65 parts of 4-amino-1-N-ethyl-omega-chloro-propionanilide are dissolved in 400 parts of water and 25 parts of 36% hydrochloric acid and then 6.9 parts of sodium nitrite are added. The diazo solution, after cooling to 10° C., is gradually added to a stirred solution at 10° C.-15° C. of 30.3 parts of sodium 2-acetylamino-5-naphthol-7-sulphonate and 28 parts of crystallised sodium acetate in 400 parts of water. Stirring is continued until coupling is complete when the new dyestuff is filtered off, washed with 5% aqueous sodium chloride, and dried.

It forms a scarlet powder, is soluble in water with a reddish orange colour, and dyes wool from an acid bath in reddish orange shades, the dyeings having good fastness to severe washing, milling, and light.

If instead of 4-amino-1-N-ethyl-omega-chloro-propionanilide there is used the equivalent weight of 4-amino-1-N-ethyl-omega-bromopropionanilide a dyestuff is obtained having very similar properties of shade and fastness.

*Example 7*

24 parts of 4-amino-2-N-ethyl-omega-chloro-propiontoluidide are diazotised by the method described in Example 2. The solution of the diazo compound so-obtained is added slowly to a stirred solution at 5°–10° C. of 30.5 parts of sodium 2- acetylamino-5-naphthol-7-sulphonate and 28 parts of crystallised sodium acetate in 400 parts of water. When coupling is complete, 40 parts of sodium chloride are added and the precipitated dyestuff filtered off, washed with 5% sodium chloride solution, and dried.

It forms a bright scarlet powder, soluble in water, and dyes wool from a dyebath containing sulphuric acid and Glauber's salt in bright reddish orange shades, the dyeings having good fastness to severe washing, milling and light.

*Example 8*

28.85 parts of 4-amino-2 - N - benzyl - omega-chloroacettoluidide are dissolved in 400 parts of water containing 25 parts of 36% hydrochloric acid and the solution cooled to 5°–7° C. A solution of 7.0 parts of sodium nitrite in 50 parts of water is then added. The solution of the diazo compound so-obtained, after filtration if necessary, is gradually added to a solution of 5°–7° C. of 30.3 parts of the sodium salt of 2-acetylamino-5-naphthol-7-sulphonic acid in 400 parts of water, to which have been added 21 parts of anhydrous sodium carbonate and 80 parts of sodium chloride. Coupling is rapid and, when complete, the new dyestuff is filtered off and dried. It dyes wool from an acid bath in orange shades, the dyeings having very good fastness to severe washing and milling.

*Example 9*

27.45 parts of 3-amino - 1- N - benzyl-omega-chloroacetanilide are diazotised by the method of Example 8. The diazo solution so-obtained is filtered, if necessary, and added gradually at 5°–7° C. to a stirred solution at 5°–7° C. of 30.3 parts of the sodium salt of 2-acetylamino-5-naphthol-7-sulphonic acid in 400 parts of water, to which have been added 21 parts of anhydrous sodium carbonate. Coupling is rapid and, when it is complete, the new dyestuff is salted out if necessary, filtered off and dried. It dyes wool from an acid bath in bright orange shades, the dyeings having very good fastness to severe washing, milling and light.

The above coupling may also be carried out in the presence of similar mild neutralising agents such as sodium bicarbonate or sodium acetate.

*Example 10*

26.65 parts of 4-amino-1-N-cyclohexyl-omega-chloroacetanilide are dissolved in 400 parts of water and 25 parts of 36% hydrochloric acid and diazotised at 15°–30° C. by the addition of a solution of 6.9 parts of sodium nitrite in 50 parts of water. The solution of the diazo compound so-obtained, is added, after filtration if necessary, with stirring to a cooled solution of 30.3 parts of the sodium salt of 2-acetylamino-5-naphthol-7-sulphonic acid in 400 parts of water to which have been added 21 parts of anhydrous sodium carbonate and 80 parts of sodium chloride. The new dyestuff so-obtained is filtered off and dried. It dyes wool from an acid bath in reddish-orange shades, the dyeings having very good fastness to severe washing and milling, and good fastness to light.

If instead of 30.3 parts of the sodium salt of 2-acetylamino - 5 - naphthol - 7 - sulphonic acid there are employed 31.7 parts of the sodium salt of 2 - propionylamino-5-naphthol - 7 - sulphonic acid or 33.1 parts of the sodium salt of n-butyryl-amino - 5 - naphthol-7-sulphonic acid, dyestuffs are obtained having similar properties.

*Example 11*

28.05 parts of 4-amino-1-N-cyclohexyl-omega-chloropropionanilide are dissolved with warming in 150 parts of water and 35 parts of 36% hydrochloric acid and the resulting solution then diluted with a further 150 parts of water. Diazotisation is effected at 20°–25° C. by the addition of 7 parts of sodium nitrite. The solution of the diazo compound so-obtained, after filtration is necessary, is cooled to 10°–12° C. and added gradually to a similarly cooled and stirred mixture of 30.3 parts of sodium 2-acetylamino-5-naphthol-7-sulphonate, 400 parts of water and 45 parts of crystallised sodium acetate. Stirring is continued for about three hours after which coupling is complete. 50 parts of sodium chloride are then added and the new dyestuff filtered off, washed with 5% aqueous sodium chloride and dried.

It dyes wool from a dyebath containing sulphuric acid and Glauber's salt in bright reddish orange shades, the dyeings having good fastness to severe washing, milling and light.

If the 4-amino-1-N-cyclohexyl-omega-chloropropionanilide is replaced by the corresponding weight of 4-amino - 1 - N-cyclohexyl-omega-bromopropionanilide or of 4-amino-1-N-cyclohexyl-α-bromopropionanilide dyestuffs having very similar properties are obtained.

*Example 12*

A solution of 25.65 parts of 4-amino-1-N-β-ethoxyethyl-omega-chloroacetanilide in 250 parts of water and 25 parts of 36% hydrochloric acid is diazotised by the addition of 6.9 parts of sodium nitrite. The diazo solution so-obtained is added gradually at 10°–15° C. to a stirred mixture of 30.3 parts of sodium 2-acetylamino-5-naphthol-7-sulphonate, 28 parts of sodium acetate crystals and 350 parts of water. When coupling is complete 30 parts of sodium chloride are added to precipitate the dyestuff which is then filtered off, washed with 10% aqueous sodium chloride, and dried.

The new dyestuff forms a red powder soluble in water to an orange solution and in concentrated sulphuric acid to a scarlet solution. It dyes wool from an acid bath in reddish orange shades of very good fastness to severe washing and milling and good fastness to light.

*Example 13*

26 parts of 4-amino-1-N-phenyl-omega-chloroacetanilide are dissolved in 400 parts of water and 25 parts of 36% hydrochloric acid and diazotised by the addition of 6.9 parts of sodium nitrite. The diazo solution, after filtration if necessary, is added to a stirred solution at 5°–10° C. of 30.3 parts of sodium 2-acetyl-amino-5-naphthol-7-sulphonate in 400 parts of water to which 30 parts of crystallised sodium acetate have been added. Stirring is continued for half an hour after which coupling is complete. The new dyestuff is precipitated by the addition of 100 parts of sodium chloride, filtered off, washed with 10% aqueous sodium chloride and dried. It forms a reddish brown powder which dissolved in water to give a reddish orange solution and in concentrated sulphuric acid to give a red solution.

The new dyestuff dyes wool from an acid dyebath in dull, very reddish orange shades, the dyeings having very good fastness to severe washing and milling.

The invention is further illustrated by the examples listed in the following table:

| Example No. | Diazo component | Coupling component | Acid-binding agent used in coupling | Shade given by the dyestuff on wool |
|---|---|---|---|---|
| 14 | 4-amino-2-N-ethyl-omega-chloroacettoluidide. | 2-N-acetyl-N-ethylamino-5-naphthol-7-sulphonic acid. | Sodium carbonate | Dull yellowish scarlet. |
| 15 | 4-amino-2-N-ethyl-α-bromopropiontoluidide. | 2-acetylamino-5-naphthol-7-sulphonic acid | ...do... | Reddish orange. |
| 16 | 4-amino-2-N-ethyl-omega-bromo-propiontluidide. | ...do... | ...do... | Do. |
| 17 | 3-amino-omega-chloroacetanilide-4-sulphonic acid. | ...do... | Sodium acetate | Orange. |
| 18 | 4-amino-2-N-etheyl-omega-chloroacettoluidide. | 2-N-acetyl-N-phenylamino-5-naphthol-7-sulphonic acid. | Sodium carbonate | Very reddish orange. |
| 19 | 4-amino-1-N-n-butyl-omega-chloroacetanilide. | 2-N-n-butyrylamino-5-naphthol-7-sulphonic acid. | Sodium acetate | Orange. |
| 20 | 4-amino-1-N-ethyl-omega-chloroacetanilide. | ...do... | Sodium carbonate | Do. |
| 21 | 4-amino-1-N-sec-butyl-omega-chloroacetanilide. | 2-acetylamino-5-naphthol-7-sulphonic acid. | Sodium acetate | Do. |
| 22 | 4-amino-1-N-ethyl-omega-bromoacetanilide. | ...do... | ...do... | Reddish orange. |
| 23 | 4-amino-omega-chloroacetanilide-3-sulphonic acid. | ...do... | ...do... | Scarlet. |
| 24 | 4-amino-1-N-cyclohexyl-omega-bromoacetanilide. | 2-N-acetyl-N-ethylamino-5-naphthol-7-sulphonic acid. | ...do... | Reddish orange. |
| 25 | 4-amino-1-N-cyclohexyl-omega-chloroacetanilide. | 2-N-acetyl-N-phenylamino-5-naphthol-7-sulphonic acid. | Sodium carbonate | Dull very reddish orange. |
| 26 | ...do... | 2-N-acetyl-N-methylamino-5-naphthol-7-sulphonic acid. | Sodium acetate | Reddish orange. |
| 27 | 4-amino-1-N-cyclohexyl-omega-chloropropionanilide. | 2-propionyl-amino-5-naphthol-7-sulphonic acid. | ...do... | Do. |
| 28 | 4-amino-2-N-benzyl-omega-chloroacetanisidide. | 2-acetylamino-5-naphthol-7-sulphonic acid. | Sodium carbonate | Scarlet. |
| 29 | 5-amino-2-N-cyclohexyl-omega-chloroacettoluidide. | ...do... | Sodium bicarbonate. | Reddish orange. |

We claim:

1. A monazo dye which in the form of its acid is represented by the formula

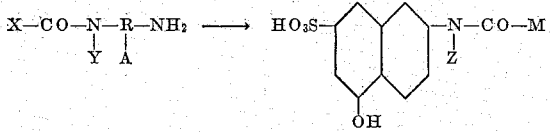

wherein X is a mono-halogeno-alkyl group having not more than 3 carbons in which halogen is one of the group consisting of chlorine and bromine; Y is one of a group consisting of hydrogen, alkyl having 1 to 6 carbons, lower alkoxyalkyl, cyclohexyl, benzyl and phenyl; —R—NH₂ is an aryl nucleus of the group consisting of anilino and toluino which is substituted in the meta- or para-position by the group X—CO—NY; A is one of a group consisting of hydrogen and sulfonic acid; Z is one of a group consisting of hydrogen, lower alkyl and phenyl; and M is a lower alkyl group.

2. A monazo dye in accordance with claim 1 in which the diazo component is unsulfonated.

3. The monazo dye which in the form of its acid is represented by the formula

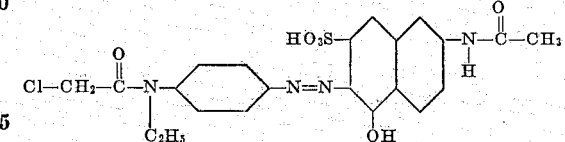

4. The monazo dye which in the form of its acid is represented by the formula

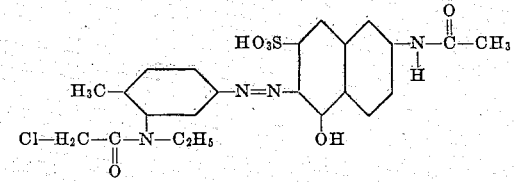

5. The monazo dye which in the form of its acid is represented by the formula

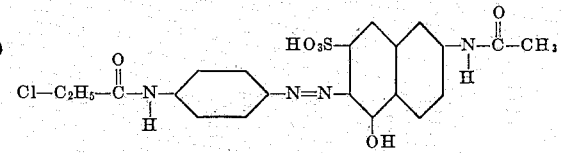

ARTHUR HOWARD KNIGHT.
WILLIAM ELLIOT STEPHEN.